United States Patent
Lin

(10) Patent No.: US 7,781,911 B2
(45) Date of Patent: Aug. 24, 2010

(54) POWER SUPPLY CIRCUIT HAVING POWER ASSIGNING ELEMENTS BETWEEN OUTPUT BRANCHES

(75) Inventor: Ching-Chung Lin, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 191 days.

(21) Appl. No.: 12/231,503

(22) Filed: Sep. 2, 2008

(65) Prior Publication Data

US 2009/0058184 A1 Mar. 5, 2009

(30) Foreign Application Priority Data

Aug. 31, 2007 (CN) .................... 2007 1 0076752

(51) Int. Cl.
*H02J 1/10* (2006.01)
(52) U.S. Cl. .................................... 307/44
(58) Field of Classification Search .............. 307/44
See application file for complete search history.

(56) References Cited

U.S. PATENT DOCUMENTS 5,917,716 A 6/1999 Cho
6,426,886 B1 * 7/2002 Goder .................. 363/56.1

FOREIGN PATENT DOCUMENTS

JP 2000-299982 A 10/2000

* cited by examiner

*Primary Examiner*—Robert L. DeBeradinis
(74) *Attorney, Agent, or Firm*—Wei Te Chung

(57) ABSTRACT

An power supply circuit includes at least one voltage converting circuit, a plurality of output branches, and a plurality of power assigning elements. The at least one voltage converting circuit is configured for converting a primary voltage signal to at least one alternating current (AC) voltage signal. Each of the output branches is configured for providing a direct current (DC) power supply to a respective load circuit based on the at least one AC voltage signal. The power assigning elements are configured to reassign the DC power supplies provided by the output branches to the load circuits.

19 Claims, 4 Drawing Sheets

POWER SUPPLY CIRCUIT HAVING POWER ASSIGNING ELEMENTS BETWEEN OUTPUT BRANCHES

FIELD OF THE INVENTION

The present disclosure relates to a power supply circuit, and more particularly to a power supply circuit having power assigning elements between output branches.

GENERAL BACKGROUND

Power supply circuits are widely used in modern electronic devices, providing power voltage signals to enable function.

One such power supply circuit generally includes an output branch for converting a provided alternating current (AC) voltage signal to a direct current (DC) voltage signal. The DC voltage signal is further provided to a plurality of load circuits simultaneously, so as to enable the load circuits to function.

Typically, an output power of the power supply circuit is substantially fixed. When a driving current flowing through one of the load circuits exceeds a normal value, the DC voltage signal provided by the output branch may be unexpectedly pulled down. This abnormal DC voltage signal may further cause other load circuits to become unstable. Therefore, the reliability of the power supply circuit is affected.

What is needed is to provide a power supply circuit that can overcome the limitations described.

SUMMARY

In one exemplary embodiment, a power supply circuit includes at least one voltage converting circuit, a plurality of output branches, and a plurality of power assigning elements. The at least one voltage converting circuit is configured for converting a primary voltage signal to at least one alternating current (AC) voltage signal. Each of the output branches is configured for providing a direct current (DC) power supply to a respective load circuit based on the at least one AC voltage signal. The power assigning elements are configured to reassign the DC power supplies provided by the output branches to the load circuits.

Other novel features and advantages will become more apparent from the following detailed description when taken in conjunction with the accompanying drawings.

DETAILED DESCRIPTION

Reference will now be made to the drawings to describe exemplary embodiments of the present disclosure in detail.

Figure 1:
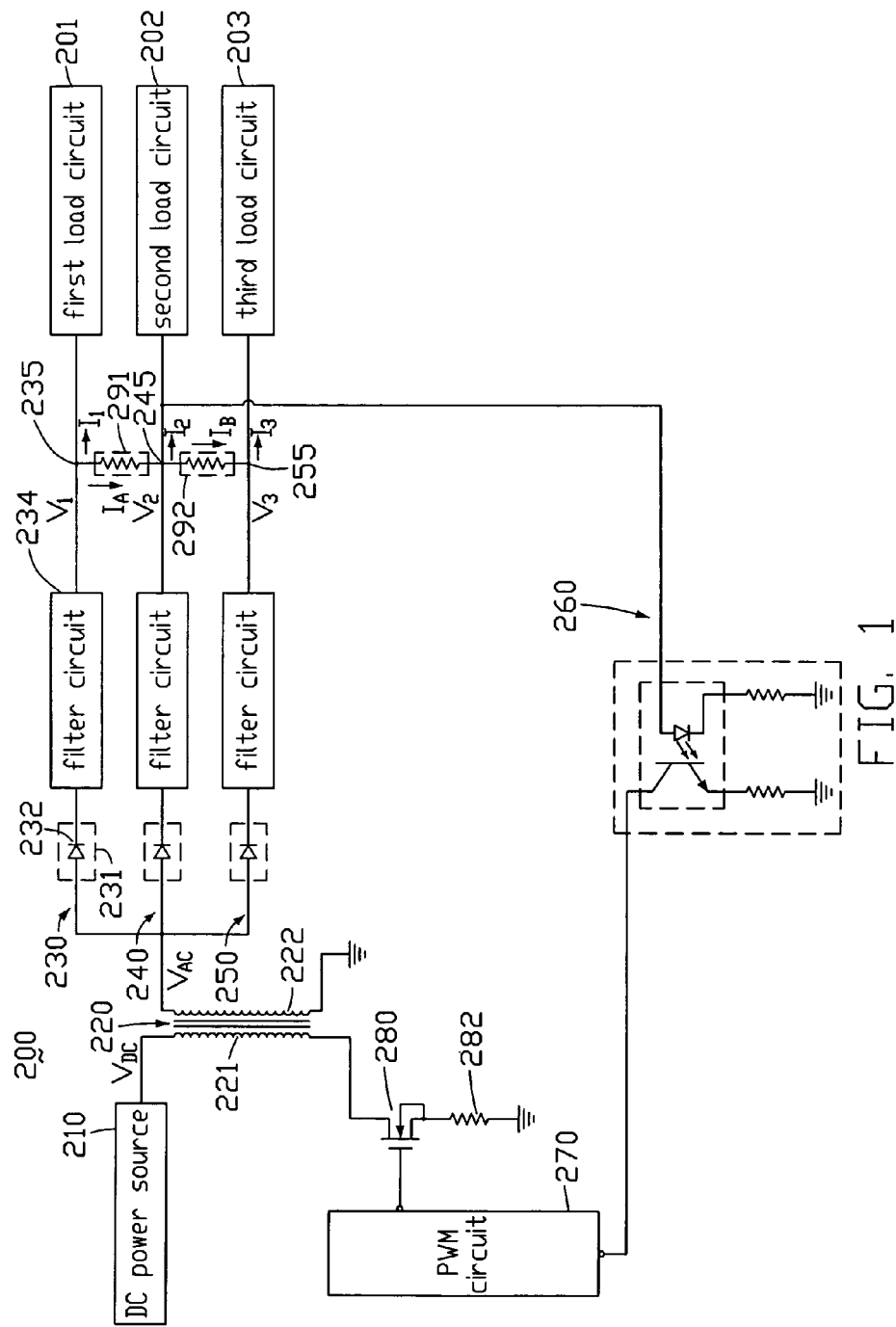
FIG. 1 is a diagram of a power supply circuit according to a first embodiment of the present disclosure.

FIG. 1 is a diagram of a power supply circuit 200 according to a first embodiment of the present disclosure. The power supply circuit 200 provides power to an electronic device, such as a liquid crystal display (LCD), for example. In one embodiment, the power supply circuit 200 includes a DC power source 210, a voltage converting circuit 220, a pulse width modulation (PWM) circuit 270, an electronic switch 280, a first output branch 230, a second output branch 240, and a third output branch 250. The electronic switch 280 can be a metal-oxide-semiconductor (MOS) transistor having a gate electrode serving as a control terminal.

In one embodiment, the voltage converting circuit 220 may be a transformer for converting a primary DC voltage signal $V_{DC}$ into an AC voltage signal $V_{AC}$, and includes a first coil 221 and a second coil 222. An end of the first coil 221 receives the primary DC voltage signal $V_{DC}$, and the other end of the first coil 221 is electrically coupled to a drain electrode of the electronic switch 280. A source electrode of the electronic switch 280 is grounded via a bias resistor 282. The control terminal of the electrode switch 280 receives a control signal (e.g. a pulse) provided by the PWM circuit 270. The control signal controls the electronic switch 280 to be switched on or be switched off. Thereby, the AC voltage signal $V_{AC}$ is generated at an end of the second coil 222 by cooperation of the first and second coils 221, 222.

The first output branch 230 includes a rectifying circuit 231, a filter circuit 234, and a first output terminal 235. The rectifying circuit 231 includes a rectifying diode 232. A positive terminal of the rectifying diode 232 receives the AC voltage signal $V_{AC}$ from the second coil 222, and a negative terminal of the rectifying diode 232 is electrically coupled to the first output terminal 235 via the filter circuit 234. In the first output branch 230, the AC voltage signal $V_{AC}$ is rectified by the rectifying circuit 231, filtered by the filter circuit 234, and converted to a first DC voltage signal $V_1$. The first DC voltage signal $V_1$ is then outputted to a first load circuit 201 via the first output terminal 235, thereby providing a power supply in the form of a DC voltage to the first load circuit 201 and enabling the first load circuit 201 to function.

Each of the second and third output branches 240, 250 has a structure and function similar to that of the first output branch 230. Thereby, a second DC voltage signal $V_2$ is generated by the second output branch 240, and supplied to a second load circuit 202 via a second output terminal 245. Similarly, a third DC voltage signal $V_3$ is generated by the third output branch 250, and supplied to a third load circuit 203 via a third output terminal 255. In particular, the first, second, and third load circuit 201, 202, 203 can for example be a universal serial bus (USB) circuit, an analog to digital (A/D) converter, and an audio circuit, respectively.

Furthermore, a first power assigning element 291 is electrically coupled between the first output terminal 235 and the second output terminal 245. A second power assigning element 292 is electrically coupled between the second output terminal 245 and the third output terminal 255. In another embodiment, the first and second power assigning elements 291, 292 can also electrically coupled in series between any two of the output terminals 235, 245, 255, with a node therebetween electrically coupled to the other one of the output terminals 235, 245, 245. The first and second power assigning elements 291, 292 are configured for reassigning the power supplies provided by the output branches 230, 240, 250 to the load circuits 201, 202, 203 according to the power requirement of the load circuits 201, 202, 203. In one embodiment, each of the first and second power assigning elements 291, 292 can be a bridge resistor. Further, a feedback branch 260, which includes a photoelectric coupler for providing a feedback voltage based on the DC voltage signals $V_1$, $V_2$, $V_3$, is electrically coupled between a selected one of the first, second, third output terminals 235, 245, 255 (where the second output terminal 245 is taken as an example in the illustrated embodiment) and the PWM circuit 270.

In normal operation, the first DC voltage signal $V_1$, the second DC voltage signal $V_2$, and the third DC voltage signal $V_3$ may have substantially the same value, for example, 5V. Thus, substantially no electrical potential difference exists between the output terminals 235, 245, 255, and thereby neither of the first and second power assigning elements 291, 292 performs the power supply reassignment between the first, second, third load circuits 201, 202, 203. Due to the DC voltage signals $V_1$, $V_2$, $V_3$, a first driving current $I_1$, a second driving current $I_2$, and a third driving current $I_3$ are respectively generated and flow to the first load circuit 201, the second load circuit 202, and the third load circuit 203. Therefore, the first, second, third load circuits 201, 202, 203 are enabled and work in normal working states.

When any of the first, second, third load circuits 201, 202, 203 work in abnormal working states, for example, the first load circuit 201 works in a so-called light loaded state, and the second load circuit 202 works in a so-called heavy loaded state. The value of second driving current $I_2$ may exceed a normal value, for example, 1.5 A (amperes), and become relatively great, for example, 1.8 A. Conversely, the value of the first driving current $I_1$ may become relatively small, for example, 1.2 A. The abnormal driving current $I_1$ further pulls up the first DC voltage signal $V_1$, and the abnormal driving current $I_2$ pulls down the second DC voltage signal $V_2$. Thus, an electrical potential difference is generated between the first and second output terminals 235, 245. In this situation, the first power assigning element 291 is activated, and a compensating current $I_A$ is generated and flows though the first power assigning element 291 to the second output terminal 245.

Due to the compensating current $I_A$, an auxiliary power supply is provided to the second output terminal 245. Thus the second DC voltage signal $V_2$ is increased, and the heavy loaded power requirement of the second load circuit 202 is met. On the other hand, the first DC voltage signal $V_1$ is reduced. However, while the first load circuit 201 working in the light loaded state, the reduced first DC voltage signal $V_1$ may still meet the power supply requirement of the first load circuit 201. That is, the first power assigning element 291 provides a power reassigning mean for reassigning the power supplies provided by the first and second output branches 230, 240 to the first and second load circuits 201, 202, so as to adjusting the power supplies applied to the first and second load circuits 201, 202 according to the power requirement (i.e. the actual working states) of the first and second load circuits 201, 202.

Similarly, the second power assigning element 292 provides another mean for adjusting the power supplies provided by the second and third output branches 240, 250. A compensating current $I_B$ may be generated and flow though this compensating mean to carry out power supply reassignment when the third load circuit 203 works in an abnormal state. Therefore, the cooperation of the first and second power assigning elements 291, 292 can reassign all power supplies provided by the output branches 230, 240, 250 to the load circuits 201, 202, 203.

In addition, in some circumstance, after the power supply reassignment, the adjusted DC voltage signals $V_1$, $V_2$, $V_3$ may still deflect from the actual power requirement. For example, after being provided with auxiliary power supplies from the first and third output branches 201, 203, the second DC voltage signal $V_2$ may be relative low all the same. In this situation, the feedback branch 260 provides a corresponding feedback signal to the PWM circuit 270. The PWM circuit 270 modulates a duty ratio of the control signal received by the electronic switch 280, and thereby the DC voltage signals $V_1$, $V_2$, $V_3$ are further adjusted to meet the actual power requirements.

According to the above description, it can be noted that each of the load circuits 201, 202, 203 independently receives power from a corresponding one of the output branches 230, 240, 250. With this configuration, any of the load circuits 201, 202, 203 suffering an abnormal working state is generally prevented from influencing other load circuits 201, 202, 203. Thus the reliability of the power supply circuit 200 is improved. Moreover, the power assigning elements 291, 292 are applied to reassign the power supplies provided by the output branches 230, 240, 250 to the load circuits 201, 202, 203, so as to adjust the power supplies applied to the load circuits 201, 202, 203 according to the actual power requirement of the load circuits 201, 202, 203. Therefore, the power efficiency of the power supply circuit 200 is increased.

Figure 2:
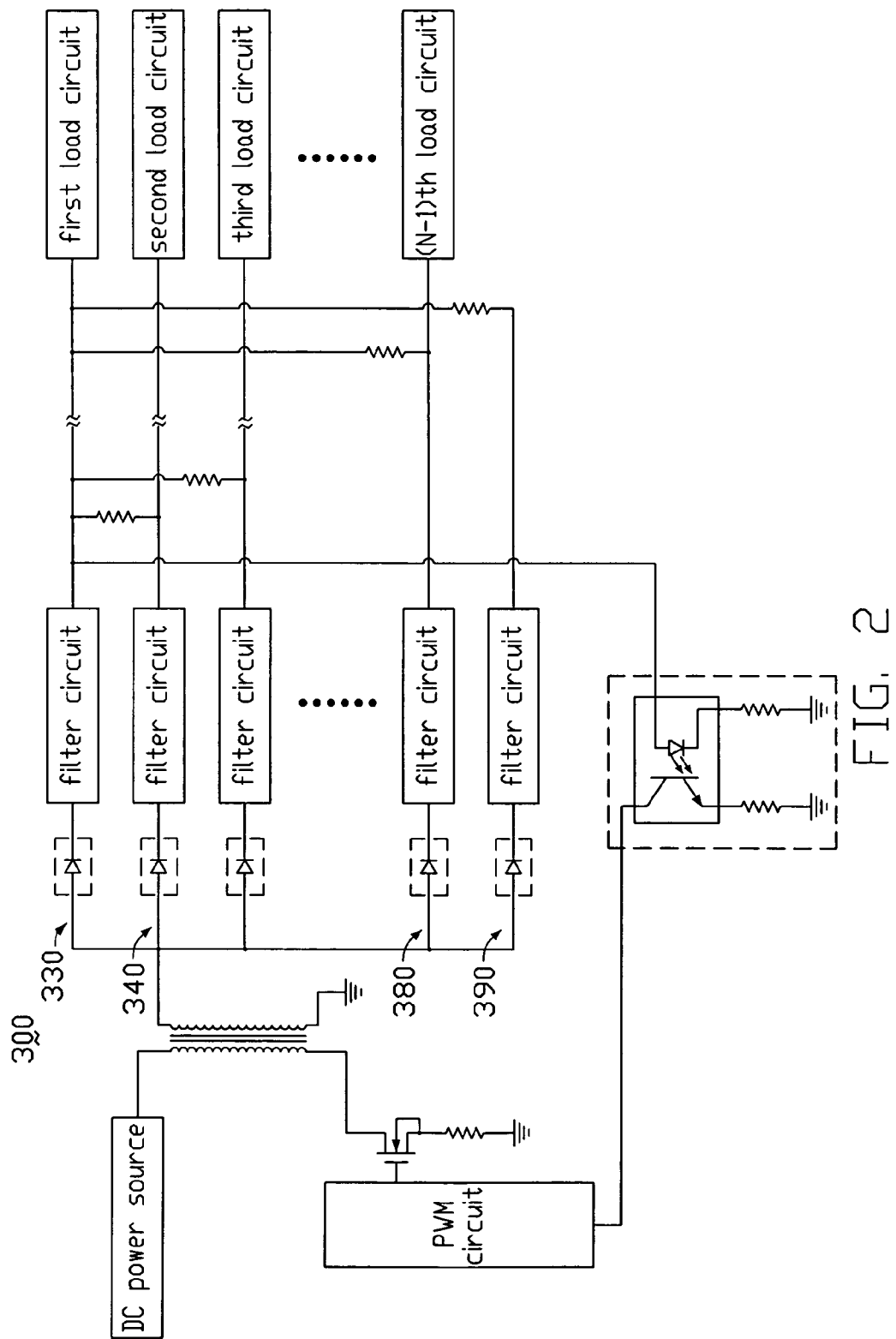
FIG. 2 is a diagram of a power supply circuit according to a second embodiment of the present disclosure.

FIG. 2 is a diagram of a power supply circuit 300 according to a second embodiment of the present disclosure. The power supply circuit 300 may be substantially similar to the above-described power supply circuit 200, only differs in that the power supply circuit 300 includes a first output branch 330, a second output branch 340, . . . an (N−1)th output branch 380, and an Nth output branch 390, where N is an integer not less than three. Each of the output branches 330, 340, . . . 380 is electrically coupled to a respective load circuit and is configured to provide power for the corresponding load circuit. The Nth output branch 390 is non-loaded, and is used to supply auxiliary power to any of the output branches 330, 340, . . . 380 whose corresponding load circuit suffering a heavy load state. Furthermore, one of the output branches 330, 340, . . . 380, 390 is selected as a base output branch, and in this embodiment, the first output branch 330 is selected, for example. In addition, any other output branch is electrically coupled to the base output branch via a respective power assigning element. In the power supply circuit 300, by employing the non-loaded output branch 390, any of the load circuits suffering a heavy loaded state can obtain auxiliary power from the Nth output branch 390, the auxiliary power may adjust the power applied to the corresponding load circuit. As a result, the power efficiency of the power supply circuit 300 is further improved.

Figure 3:
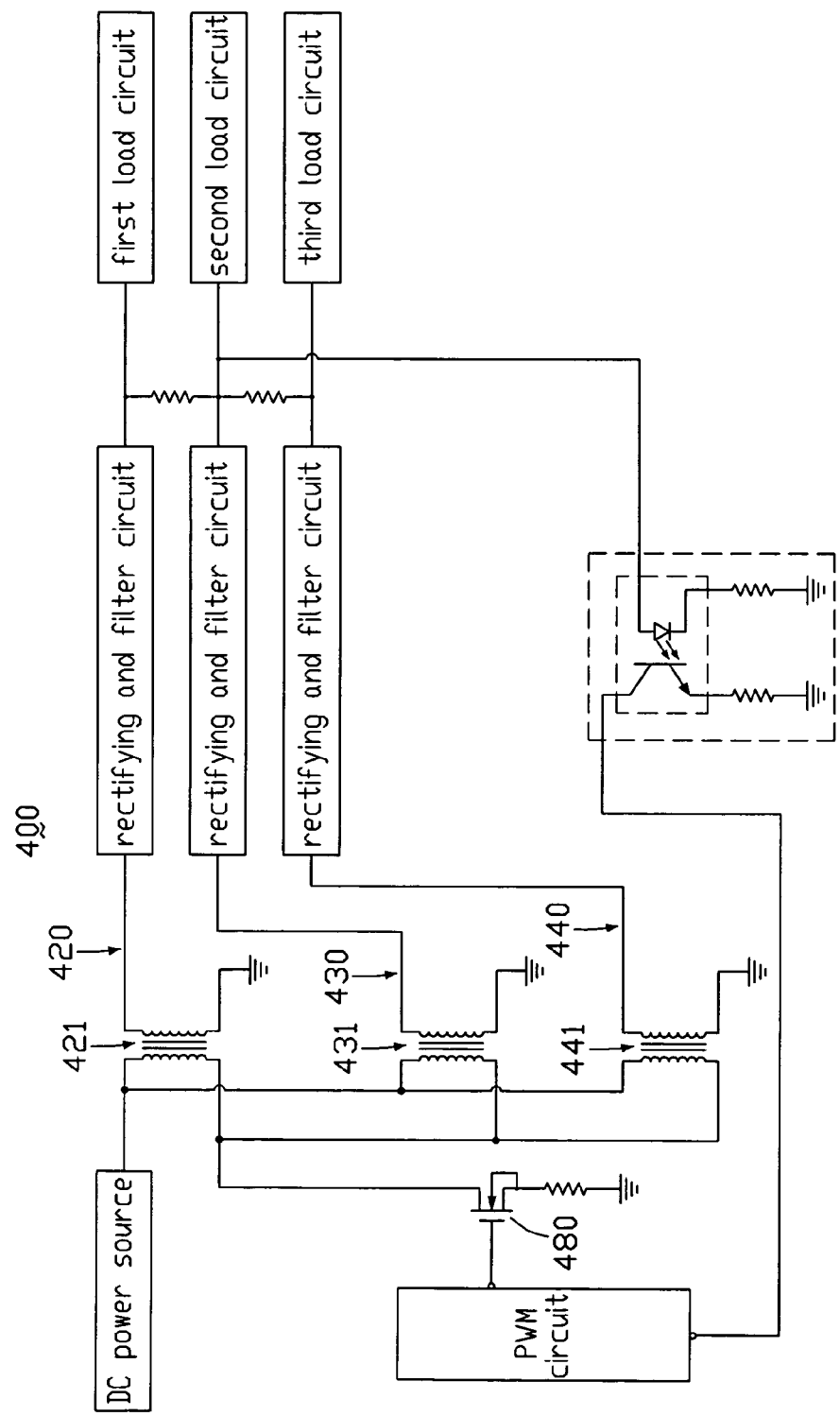
FIG. 3 is a diagram of a power supply circuit according to a third embodiment of the present disclosure.

FIG. 3 is a diagram of a power supply circuit 400 according to a third embodiment of the present disclosure. The power supply circuit 400 may be substantially similar to the above-described power supply circuit 200, only differs in that the power supply circuit 400 includes a first voltage converting circuit 421, a second voltage converting circuit 431, and a third voltage converting circuit 441. All the voltage converting circuits 421, 431, 441 are electrically coupled to an electronic switch 480. The electronic switch 480 controls the power converting circuits 421, 431, 441 to respectively converted a primary DC voltage signal to a first AC voltage signal, a second AC voltage signal, and a third AC voltage signal, based on a control signal applied to the electronic switch 480. The first, second, third AC voltage signals are further converted to a first DC voltage signal, a second DC voltage signal, and a third DC voltage signal via a first output branch 420, a second output branch 430, and a third output branch 440, and then supplied to a first load circuit, a second load circuit, and a third load circuit, respectively.

Figure 4:
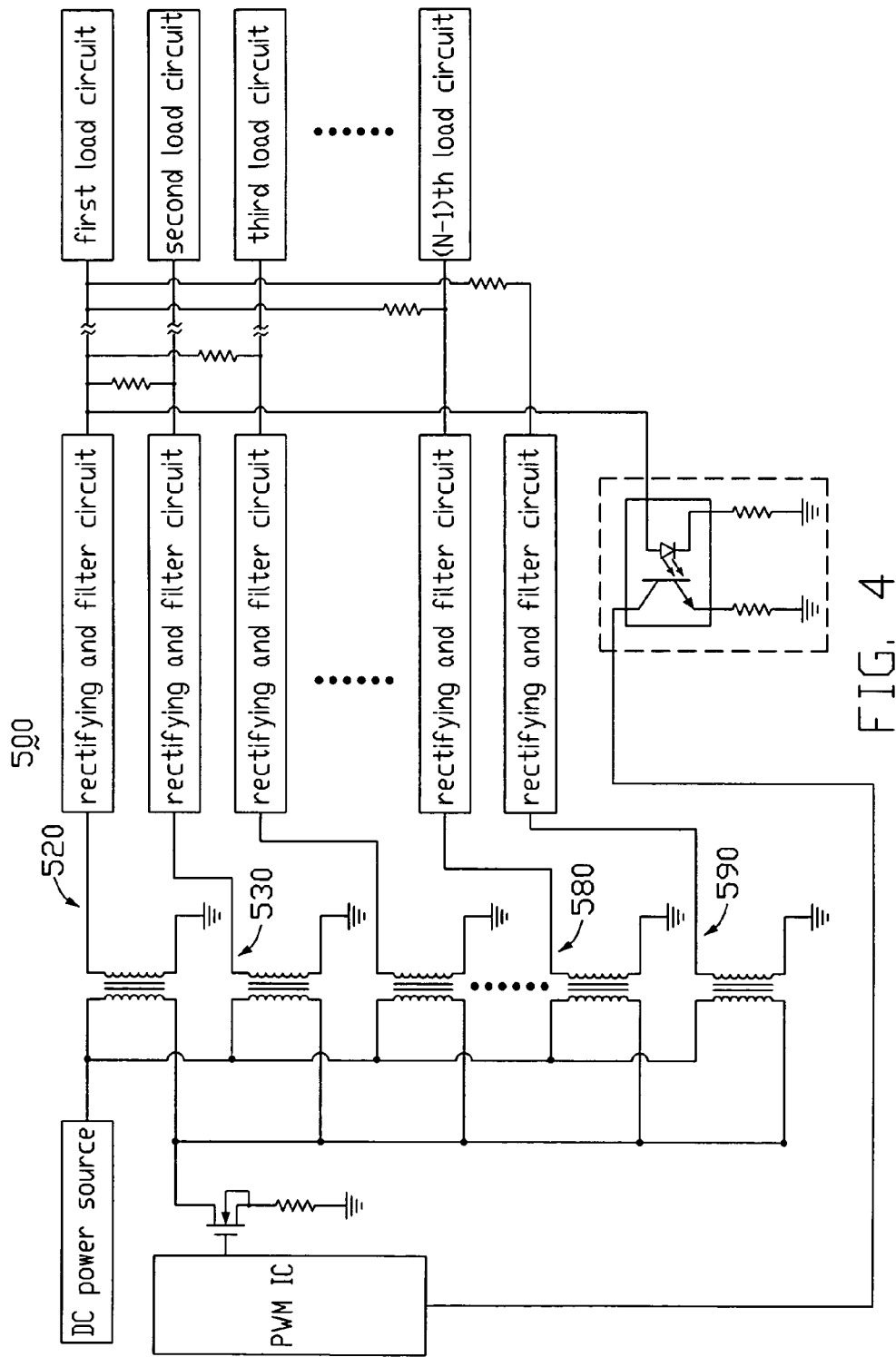
FIG. 4 is a diagram of a power supply circuit according to a exemplary embodiment of the present disclosure.

FIG. 4 is a diagram of a power supply circuit 500 according to a fourth embodiment of the present disclosure. The power supply circuit 500 may be substantially similar to the above-described power supply circuit 400, only differs in that the power supply circuit 500 includes a first output branch 520, a second output branch 530, . . . an (N−1)th output branch 580, and an Nth output branch 590, where N is an integer not less than three. Each of the output branches 520, 530, . . . 580 provides power to a respectively load circuit, while the Nth output branch 590 serving as an auxiliary power provider and being non-loaded.

It is to be further understood that even though numerous characteristics and advantages of various inventive embodiments have been set out in the foregoing description, together with details of structures and functions associated with the embodiments, the disclosure is illustrative only; and that changes may be made in detail (including in matters of arrangement of parts) within the principles of the disclosure to the full extent indicated by the broad general meaning of the terms in which the appended claims are expressed.

What is claimed is:

1. A power supply circuit, comprising:
   at least one voltage converting circuit configured for converting a primary voltage signal to at least one alternating current (AC) voltage signal;
   a plurality of output branches, each of which is configured for providing a direct current (DC) power supply to a respective load circuit based on the at least one AC voltage signal; and
   a plurality of power assigning elements configured to reassign the DC power supplies provided by the output branches to the load circuits.

2. The power supply circuit of claim 1, wherein each of the power assigning elements is a resistor.

3. The power supply circuit of claim 1, wherein each of the output branches comprises an output terminal configured for outputting the DC power supply to the corresponding load circuit.

4. The power supply circuit of claim 3, wherein each of the output terminals is electrically coupled via the power assigning elements in series.

5. The power supply circuit of claim 1, wherein one of the output branches is selected as a base output branch, and any other output branch is electrically coupled to the base output branch via a corresponding one of the power assigning elements.

6. The power supply circuit of claim 5, further comprising a feedback branch configured for providing a feedback signal according to the power supply provided by the base output branch.

7. The power supply circuit of claim 1, further comprising a non-loaded output branch configured for providing an auxiliary power supply to any selected one of the load circuits corresponding to other output branches.

8. The power supply circuit of claim 1, wherein the at least one voltage converting circuit comprises a plurality of voltage converting circuits, and each of the plurality of voltage converting circuits is configured for converting the primary voltage signal to a respective AC voltage signal, and outputting the AC voltage signal to a corresponding one of the output branches.

9. The power supply circuit of claim 8, wherein the voltage converting circuit is a transformer.

10. The power supply circuit of claim 1, wherein each of the load circuits is selected from the group consisting of a universal serial bus circuit, an analog to digital circuit, and an audio circuit.

11. A power supply circuit, comprising:
    at least one voltage converting circuit configured for providing at least one primary voltage signal;
    a plurality of output branches, each of which is configured for providing a respective output voltage signal according to the at least one primary voltage signal; and
    a plurality of power assigning elements electrically coupled between the output branches.

12. The power supply circuit of claim 11, wherein each of the power assigning elements is a resistor.

13. The power supply circuit of claim 11, wherein each of the output branches comprises an output terminal electrically coupled to a respective load circuit.

14. The power supply circuit of claim 13, wherein each of the output terminals is electrically coupled via the power assigning elements in series.

15. The power supply circuit of claim 13, wherein one of the output branches is selected as a base output branch, and any other output branch is electrically coupled to the output terminal of the base output branch via a corresponding one of the power assigning elements.

16. The power supply circuit of claim 15, further comprising a feedback branch configured for providing a feedback signal according to the electrical potential of the output terminal of the base output branch.

17. The power supply circuit of claim 11, further comprising a non-loaded output branch configured for providing an auxiliary power supply to any selected one of the load circuits corresponding to other output branches.

18. The power supply circuit of claim 11, wherein the at least one voltage converting circuit comprises a plurality of voltage converting circuits, and each of the plurality of voltage converting circuits is configured for converting the primary voltage signal to a respective AC voltage signal, and outputting the AC voltage signal to a corresponding one of the output branches.

19. The power supply circuit of claim 11, wherein each of the load circuits is selected from the group consisting of a universal serial bus circuit, an analog to digital circuit, and an audio circuit.

* * * * *